United States Patent
Bahrs et al.

(10) Patent No.: US 9,800,476 B2
(45) Date of Patent: Oct. 24, 2017

(54) DYNAMIC SYSTEM SEGMENTATION FOR SERVICE LEVEL AGREEMENTS ENFORCEMENT

(71) Applicant: International Business Machines Corporation, Armonk, NY (US)

(72) Inventors: Peter C. Bahrs, Georgetown, TX (US); Kyle G. Brown, Apex, NC (US); Samir A. Nasser, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 349 days.

(21) Appl. No.: 14/617,902

(22) Filed: Feb. 9, 2015

(65) Prior Publication Data
US 2016/0232193 A1   Aug. 11, 2016

(51) Int. Cl.
G06F 17/00   (2006.01)
H04L 12/24   (2006.01)
G06F 17/30   (2006.01)

(52) U.S. Cl.
CPC .... *H04L 41/5019* (2013.01); *G06F 17/30371* (2013.01)

(58) Field of Classification Search
CPC ......... G06F 17/30371; G06F 17/30377; G06F 17/30; G06F 17/30424
USPC .................................................. 707/600–899
See application file for complete search history.

(56) References Cited

U.S. PATENT DOCUMENTS

| | | |
|---|---|---|
| 8,286,239 B1 | 10/2012 | Sutton |
| 8,756,094 B2 | 6/2014 | Keinan |
| 8,762,525 B2 | 6/2014 | Devarakonda et al. |
| 2014/0278574 A1* | 9/2014 | Barber .................. B60W 40/09 705/4 |

OTHER PUBLICATIONS

"Environment Isolation in IBM PureApplication System"; IBM Redboosk Solution Guide; May 2013.
"Mechanism for Operational Risk Monitoring, System Testing Optimization and Root Cause Analysis for Complex Applications"; IPCOM000237767D; ip.com; Jul. 2014.

* cited by examiner

Primary Examiner — Isaac M Woo
(74) Attorney, Agent, or Firm — Patterson + Sheridan, LLP

(57) ABSTRACT

In service level agreement enforcement, a segmentation module intercepts a request for a current runtime environment, extracts request data from the request, and passes request data to a risk assessment component. The risk assessment component finds a request history profile matching the request data, determines a request impact on runtime environment resources from the request history profile, and obtains the current state of the current runtime environment. The risk assessment module determines the risk to the service level agreement associated with the request or any other request currently executing if the request is serviced in the current runtime environment, based on the request impact and the current state of the current runtime environment, and outputs the risk assessment to the segmentation module. When the risk assessment indicates a risk, the segmentation module passes the request to an isolated runtime environment. Otherwise, the request is passed to the current runtime environment.

20 Claims, 8 Drawing Sheets

DYNAMIC SYSTEM SEGMENTATION FOR SERVICE LEVEL AGREEMENTS ENFORCEMENT

BACKGROUND

An IT runtime environment runs a collection of systems that share resources. Some of these resources include applications, virtual images, processors, memory, middleware, connections, data, networks, etc. Each system may service different types of requests. These systems may run for a certain amount of time without any negative impact on any service level agreement (SLA). For example, a SLA may require a response time of 10 seconds or less for a particular request type. For another example, a SLA may require that a throughput of a given request type be 1000 per hour or more. Since the systems in the runtime environment share resources, a change in the processing of a particular request type can have a negative impact on the SLA of other requests, regardless of whether they are served by the same system or not. For example, an increase in the data size for one request may result in a system slowdown leading to unacceptable response time for other active requests. For another example, a particular request type causes a negative database performance impact because the request runs a batch job. Thus, this request will impact the response times of other requests that depend on the same database. The conditions that lead to SLA problems may occur once, recur, or persist. In a shared environment where multiple systems from different customers are hosted, a problem with an SLA can have negative consequences.

SUMMARY

According to one embodiment of the present invention, in a method for service level agreement enforcement, a segmentation module intercepts a request for a current runtime environment. The segmentation module extracts request data from the request and passes the request data to a risk assessment component. The risk assessment component performs a risk assessment of servicing the request in a runtime environment based on a request history profile, the request data, and a current state of the current runtime environment. The segmentation module receives a risk assessment from the risk assessment component. When the risk assessment indicates a risk to a service level agreement associated with the request, the segmentation module passes the request to an isolated runtime environment. When the risk assessment does not indicate the risk to the service level agreement associated with the request, the segmentation module passes the request to the current runtime environment.

In performing the risk assessment, the risk assessment component finds the request history profile matching the request data, determines a request impact on runtime environment resources from the matching request history profile, and obtains the current state of the current runtime environment. The risk assessment module determines the risk to the service level agreement associated with the request or any other request currently executing if the request is serviced in the current runtime environment, based on the request impact and the current state of the current runtime environment, and outputs the risk assessment and the current state of the current runtime environment to the segmentation module.

In one aspect of the present invention, the request history profile comprises request details and the request impact of previously recorded requests. The risk assessment module finds the matching request history profile by comparing the request data with the request details of the previously recorded requests.

In one aspect of the present invention, upon receiving the risk assessment from the risk assessment module, the segmentation module queries the risk assessment component for the service level agreement associated with the request and determines whether the request may to be serviced by the current runtime environment within the requirements of the service level agreement based on the current state of the current runtime environment. If so, then the segmentation module holds the request, and at some time later, the segmentation module queries the risk assessment component for an updated risk assessment. When the updated risk assessment does not indicate the risk to the service level agreement associated with the request, the segmentation module reads the request and passes the request to the current runtime environment. If not, the segmentation module passes the request to the isolated runtime environment.

System and computer program products corresponding to the above-summarized methods are also described and claimed herein.

DETAILED DESCRIPTION

Figure 1:
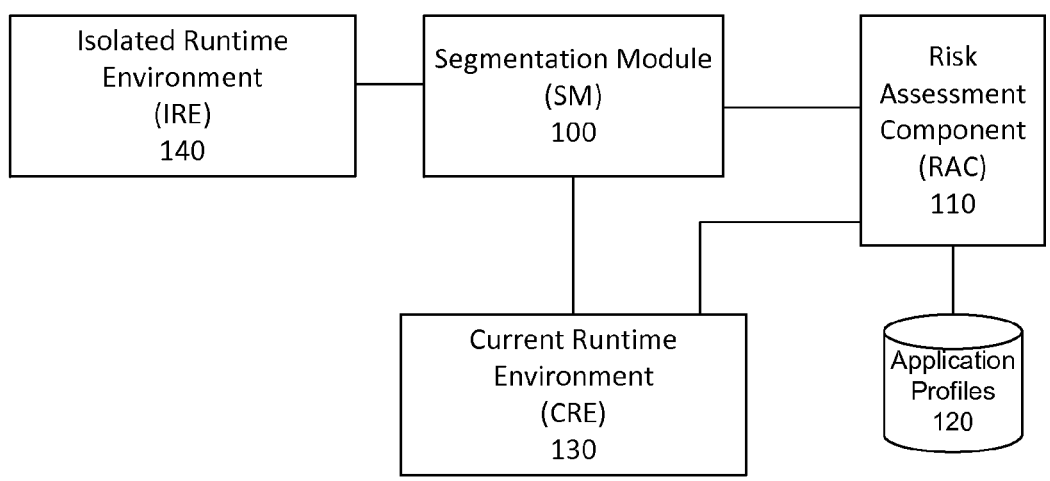
FIG. 1 illustrates a system for service level agreement enforcement according to embodiments of the present invention.
Figure 9:
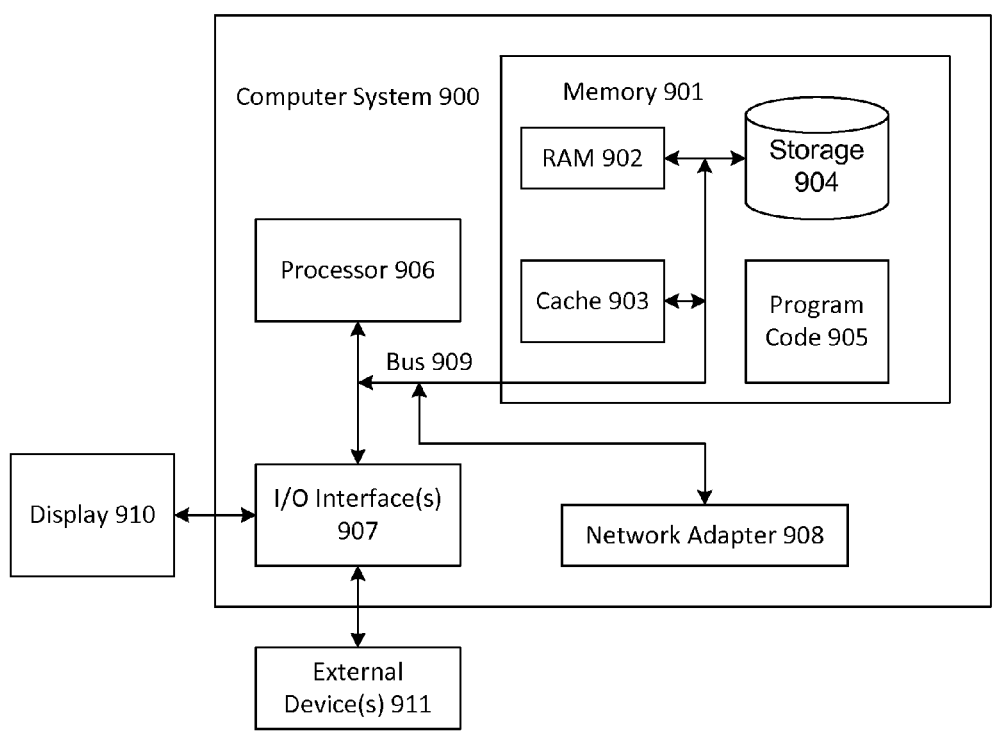
FIG. 9 illustrates a computer system according to embodiments of the present invention.

FIG. 1 illustrates a system for service level agreement enforcement according to embodiments of the present invention. The system includes a segmentation module 100, which interfaces with a risk assessment component 110 and a current runtime environment 130. The current runtime environment 130 comprises a collection of systems (not shown) that share resources, such as applications, virtual images, processors, memory, middleware, connections, data, and networks. The segmentation module 100 is capable of provisioning an isolated runtime environment 140 which mirrors the virtual machines and components (not shown) of the current runtime environment 130 at a given time. The risk assessment component 110 includes a plurality of application profiles 120, described in more detail further below. The segmentation module 100 and the risk assessment component 110 may each be a software component, a hardware component, or a combination of software and hardware components implemented in a computer system. FIG. 9 illustrates a computer system according to embodiments of the present invention. The "computer system 900" may be a single computing device or multiple computing devices that share resources. The computer system 900 is operationally coupled to a processor or processing units 906, a memory 901, and a bus 909 that couples various system components, including the memory 901 to the processor 906. The bus 909 represents one or more of any of several types of bus structure, including a memory bus or memory controller, a peripheral bus, an accelerated graphics port, and a processor or local bus using any of a variety of bus architectures. The memory 901 may include computer readable media in the form of volatile memory, such as random access memory (RAM) 902 or cache memory 903, or non-volatile storage media 904. The memory 901 may include at least one program product having a set of at least one program code module 905 that are configured to carry out the functions of embodiment of the present invention when executed by the processor 906. The computer system 900 may also communicate with one or more external devices 911, such as a display 910, via I/O interfaces 907. The computer system 900 may communicate with one or more networks via network adapter 908. In one embodiment, the segmentation module 100 and risk assessment component 110 are implemented in a load balancing computing system, or a "load balancer", as part of a manner of balancing the workloads of the systems in the current runtime environment 130. The load balancer may be implemented externally to the current runtime environment 130 and/or on a separate network from the current runtime environment 130.

Figure 2:
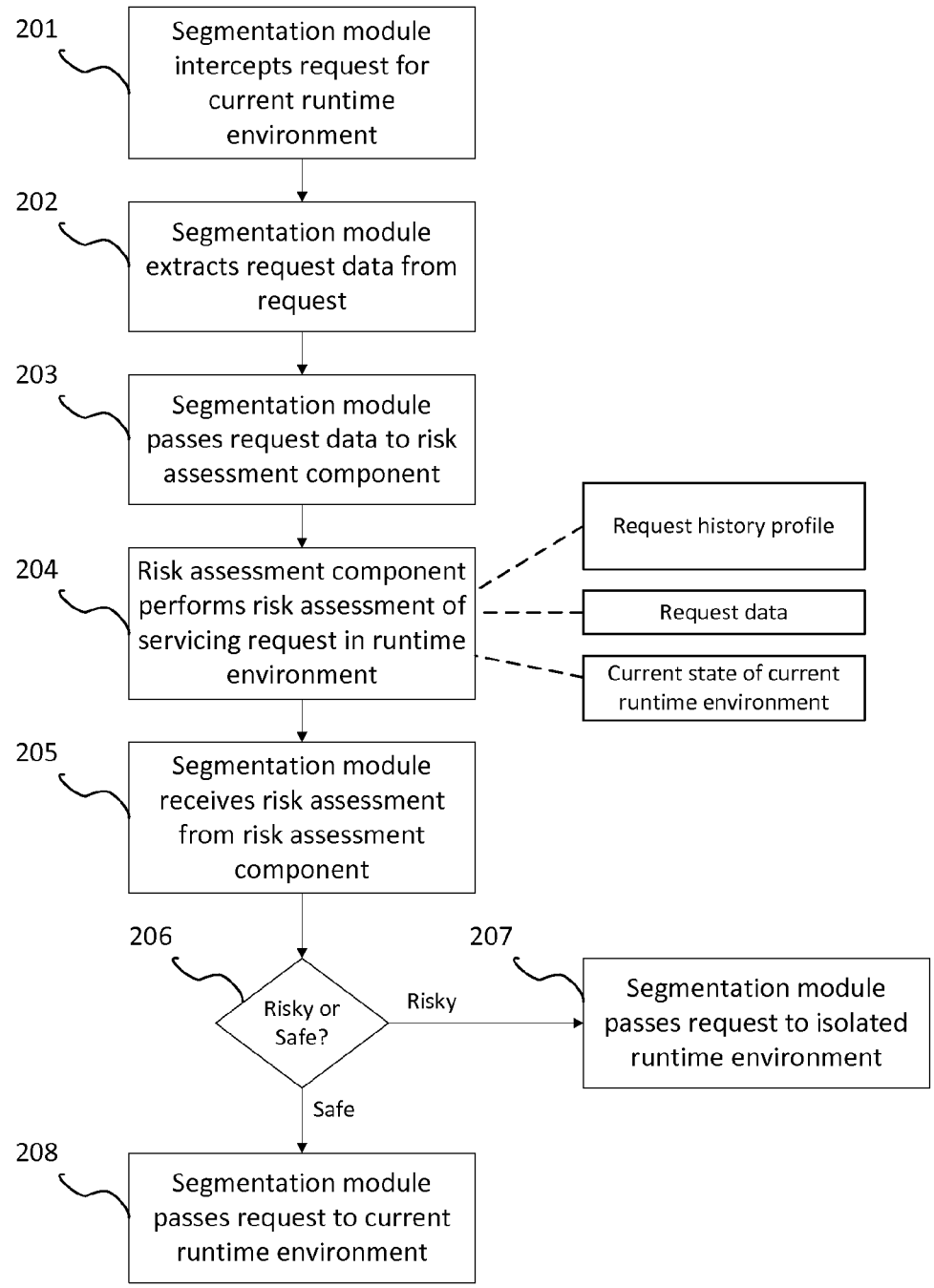
FIG. 2 is a flowchart illustrating a method for service level agreement enforcement according to embodiments of the present invention.

FIG. 2 is a flowchart illustrating a method for service level agreement enforcement according to embodiments of the present invention. At runtime, the segmentation module 100 intercepts a request destined for the current runtime environment 130 (201). The segmentation module 202 extracts request data from the request (202) and passes the request data to the risk assessment component 110 (203). The risk assessment component 110 performs a risk assessment of the servicing of the request in the current runtime environment (204), using a corresponding request history profile (described further below), the request data, and a current state of the current runtime environment 130. The risk assessment indicates the impact on runtime environment resources of servicing the request in the current runtime environment 130 with the current state. The risk assessment component 110 then returns the risk assessment to the segmentation module 100, which in this embodiment, indicates whether or not servicing the request presents a risk to the current runtime environment 130, e.g., "risky" or "safe". "Risk" in this embodiment is defined as negative impact on service level agreements if the request is run in the current runtime environment 130 at its current state. The segmentation module 100 receives the risk assessment from the risk assessment component 110 (205). When the risk assessment indicates that servicing the request is "risky" (206), the segmentation module 100 passes the request to an isolated runtime environment 140 to be serviced (207). When the risk assessment indicates that servicing the request is "safe" (206), the segmentation module 100 passes the request to the current runtime environment (208). In one embodiment, the isolated runtime environment 140 may be automatically provisioned by the segmentation module 100 through virtual builds with or without applications. Alternatively, the isolated runtime environment 140 may already be provisioned especially to run risky requests to avoid the impact on the current runtime environment 130.

Figure 3:
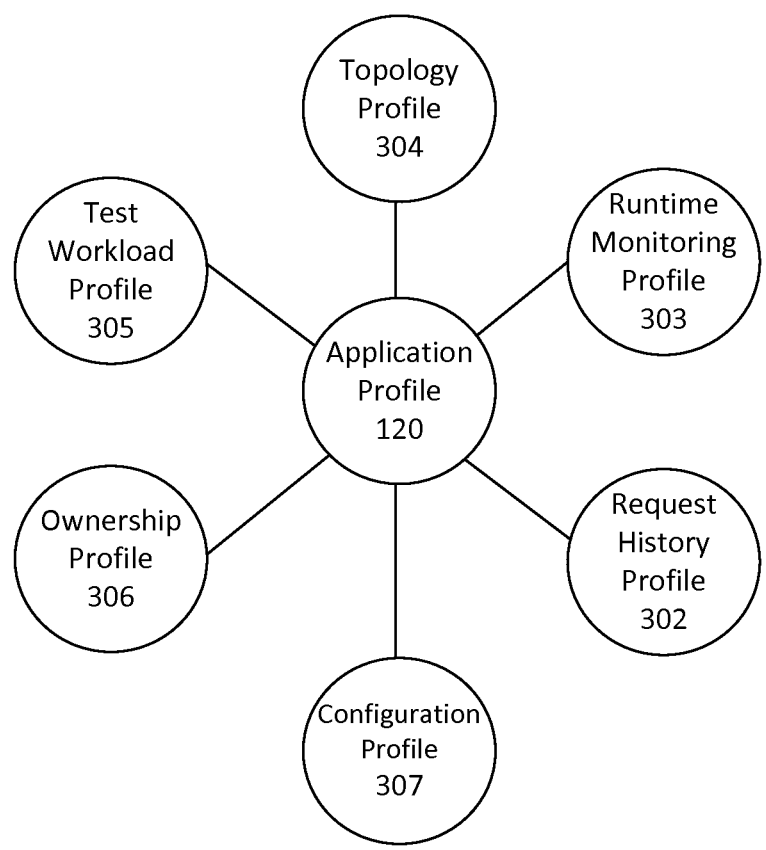
FIG. 3 illustrates an application profile according to embodiments of the present invention.

FIG. 3 illustrates an application profile according to embodiments of the present invention. Each application profile 120 includes a request history profile 302, which includes details of a particular request and the request impact on runtime environment resources of the particular request. Example request details include: the target component; operation; parameters (e.g. type and size); user; location; credentials; and time and frequency. For example, the target component may be a web service, the operation may be getOrder( ), and the parameters may be the identity of the order which is expected to retrieve one order or a null which is expected to retrieve potentially a huge result set (which may be risky during business hours). Other request details may be encoded in the request history profile 302. Example request impact includes the contribution of the request to CPU utilization, memory consumption, number of open file descriptors, and systems accessed. Other impact types can be encoded in the request history profile 302 and corresponding metrics can be collected from the runtime environment by the risk assessment component 110. The application profile 120 may further include one or more of the following: a runtime monitoring profile 303, which specifies the metrics to be monitored for a given application topology and accepted values for the corresponding metrics; a topology profile 304, which encodes the application components and their inter-relationships; a test workload profile 35, which encodes test cases for the risk assessment, commands, parameters and results; an ownership profile 306, which encodes users and/or groups and their access, commands and context; and a configuration profile 307, which encodes the environment configuration data for an application system.

Figure 4:
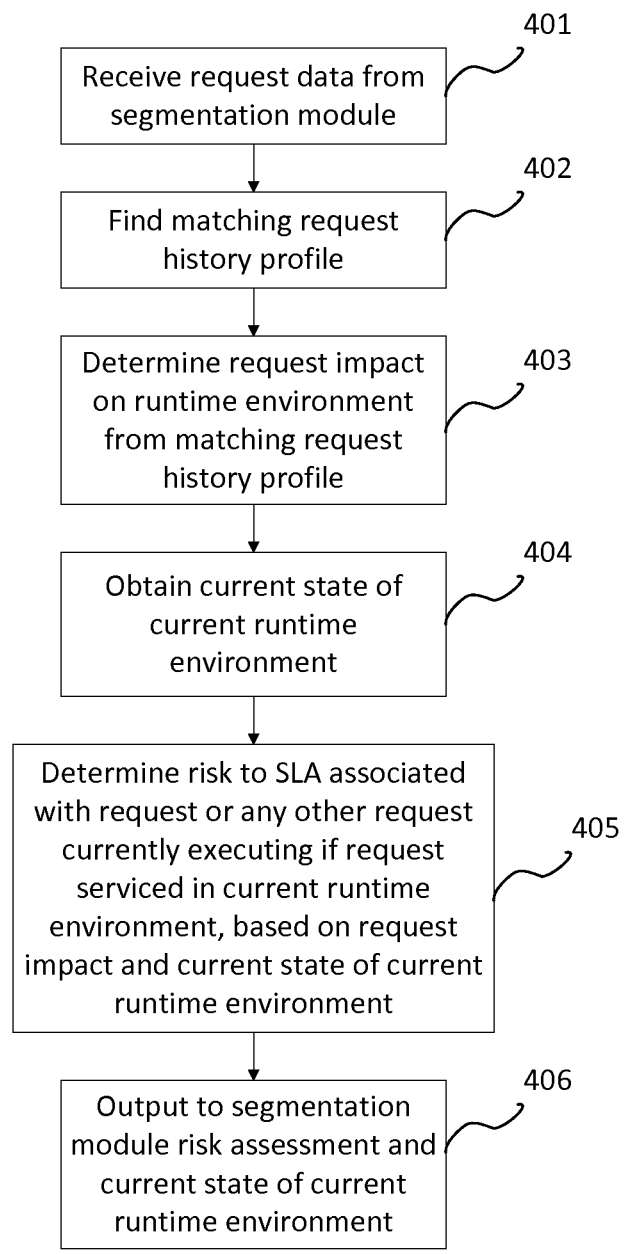
FIG. 4 is a flowchart illustrating in more detail the risk assessment performed by the risk assessment component according to embodiments of the present invention.

FIG. 4 is a flowchart illustrating in more detail the risk assessment performed by the risk assessment component according to embodiments of the present invention. The risk assessment component 100 receives the request data from the segmentation module 100 (401). In this embodiment, the request data includes: a request signature, e.g. target component, operation, and parameters (such as an URL, a web service, or a command line invocation); a request context, e.g. the user, credentials, location, and time and frequency; and a request operation, e.g. the results of executing a request in terms of CPU, memory, connections, and systems accessed. For example, if the request is a web service request, then the request data includes the target service, the operation name, the request parameters including type and size, the user issuing the request, the source host the request is coming from, and the time the request is issued. The list of request data may be extended. If a request data element is found to contribute to the risk to a service level agreement, then this element can be added to the list of request data passed to the risk assessment component 110. The risk assessment component 110 then finds a matching request history profile 302 (402). In this embodiment, the risk assessment component 110 compares the request data with the request details in the request history profiles 302. What is considered a "match" can be constructed through predetermined and configurable rules. For example, a matching rule may be to match the request sender. Thus if the request sender="Large Company", then a request history profile 302 with a request sender="Large Company" would be considered a "match". In this example, all other request elements are not important for matching purposes. Once a match is found, the risk assessment component 110 determines the request impact on the runtime environment resources from the matching request history profile 302 (403). For example, the matching request history profile 302 indicates that the last time this request type was run was at 2:00 a.m., and the corresponding impact was a CPU utilization of over 90% on a database. The risk assessment component 110 obtains the current state of the current runtime environment 130 (404) and determines the risk to the service level agreement (SLA) associated with the request or any other request currently executing if the request is serviced in the current runtime environment 130 (405), based on the request impact and the current state of the current runtime environment 130. In this embodiment, the current state of the current runtime environment 130 is captured through the runtime monitoring of the current CPU utilization, memory consumption, network activity, file system activity, and load. What data to consider in the risk assessment decision may also be constructed through pre-determined and configurable rules. For the above matching example, an example risk assessment rule may be that if the memory consumption is greater than or equal to 60%, then the request is risky. Another example of a risk assessment rule may be: If login user="DBA" and request="DROP *", then command is risky. In this example, the request is risky regardless of the current state of the environment. The risk assessment component 110 outputs the risk assessment and the current state of the current runtime environment 130 to the segmentation module 100 (406).

Figure 5:
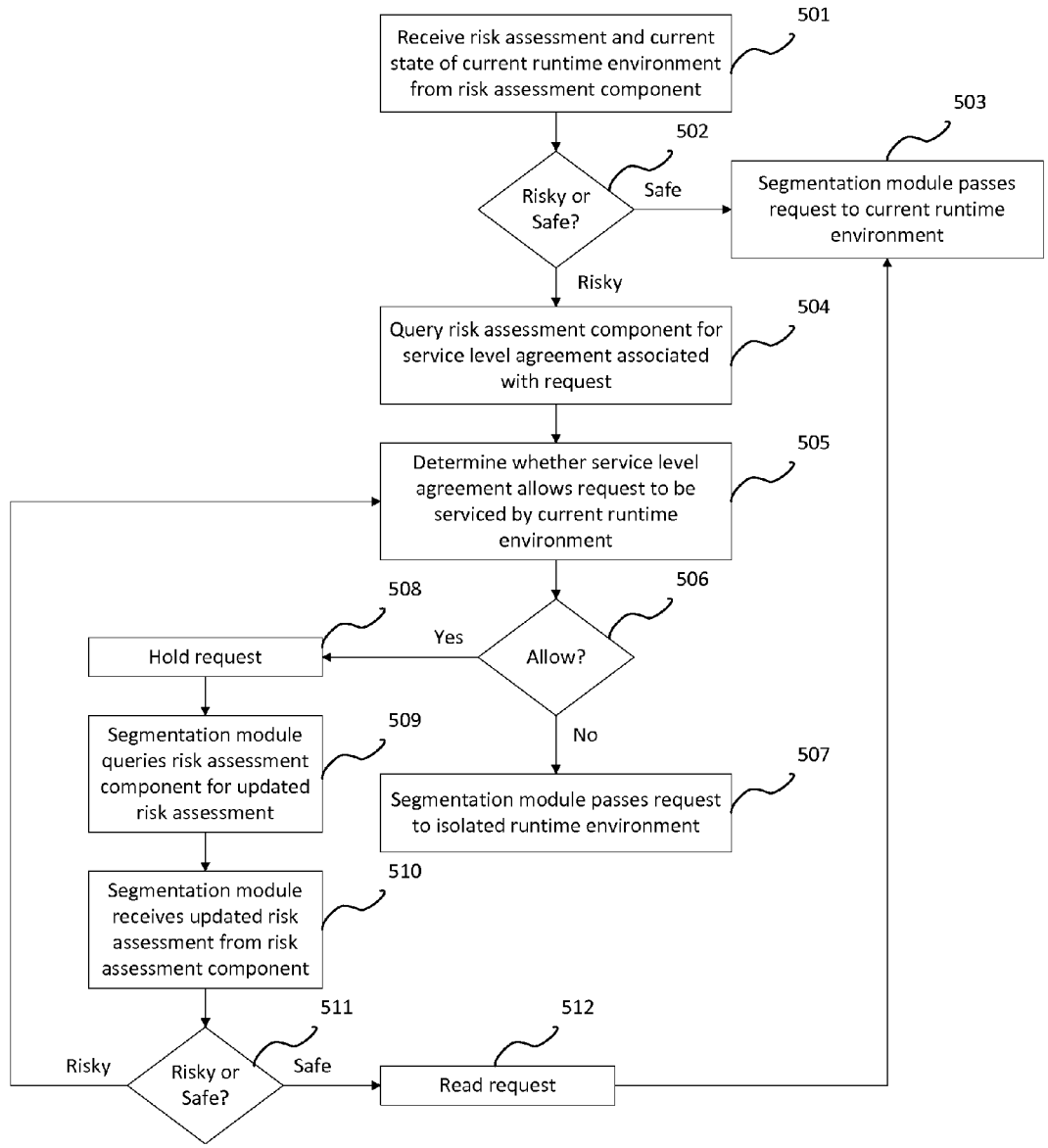
FIG. 5 is a flowchart illustrating in more detail the processing of the risk assessment by the segmentation module according to embodiments of the present invention.

FIG. 5 is a flowchart illustrating in more detail the processing of the risk assessment by the segmentation module according to embodiments of the present invention. The segmentation module 100 receives the risk assessment and the current state of the current runtime environment 130 from the risk assessment component 110 (501). If the risk assessment is "safe" (502), then the segmentation module 100 passes the request to the current runtime environment 130 (503). If the risk assessment is "risky" (502), then the segmentation module 100 queries the risk assessment component 110 for the service level agreement (SLA) associated with the request (504). After receiving the SLA from the risk assessment component 110, the segmentation module 100 determines whether the SLA allows the request to be serviced by the current runtime environment 130 based on the current state of the current runtime environment 130 (505). The SLA "allows" the request to be serviced if the current runtime environment 130 can service the request within the requirements of the SLA. If the SLA does not allow (506), then the segmentation module 100 passes the request to the isolated runtime environment 140 (507). If the SLA allows (506), then the segmentation module 100 holds the request (508). The holding of the request may be desirable, for example, when the overhead incurred in servicing the request in an isolated runtime environment would be too costly. At some time later, the segmentation module 100 queries the risk assessment component 110 for an updated risk assessment (509). The risk assessment component 110 performs a risk assessment, as set forth above, with an (updated) current state of the current runtime environment 130. The segmentation module 100 receives the updated risk assessment from the risk assessment component 110 (510). When the updated risk assessment is "safe" (511), the segmentation module 100 reads the request (512) and passes the request to the current runtime environment 130 (503). When the updated risk assessment is "risky" (511), the segmentation module 100 repeats steps 505-511.

In the above manner, embodiments of the present invention can dynamically change the system runtime so that requests can be executed without negative impacts on service level agreements.

Figure 6:
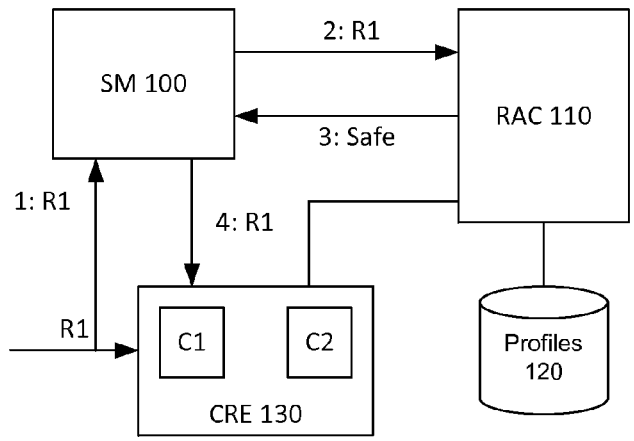
FIGS. 6-8 illustrate examples of service level agreement enforcement according to embodiments of the present invention.
Figure 7:
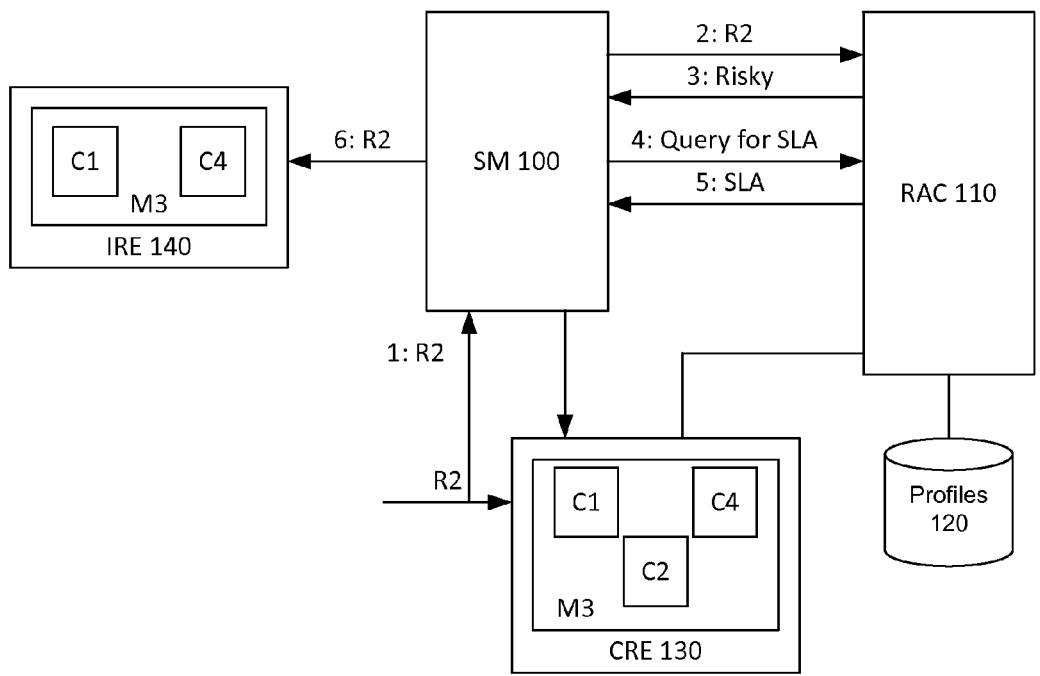
Figure 8:
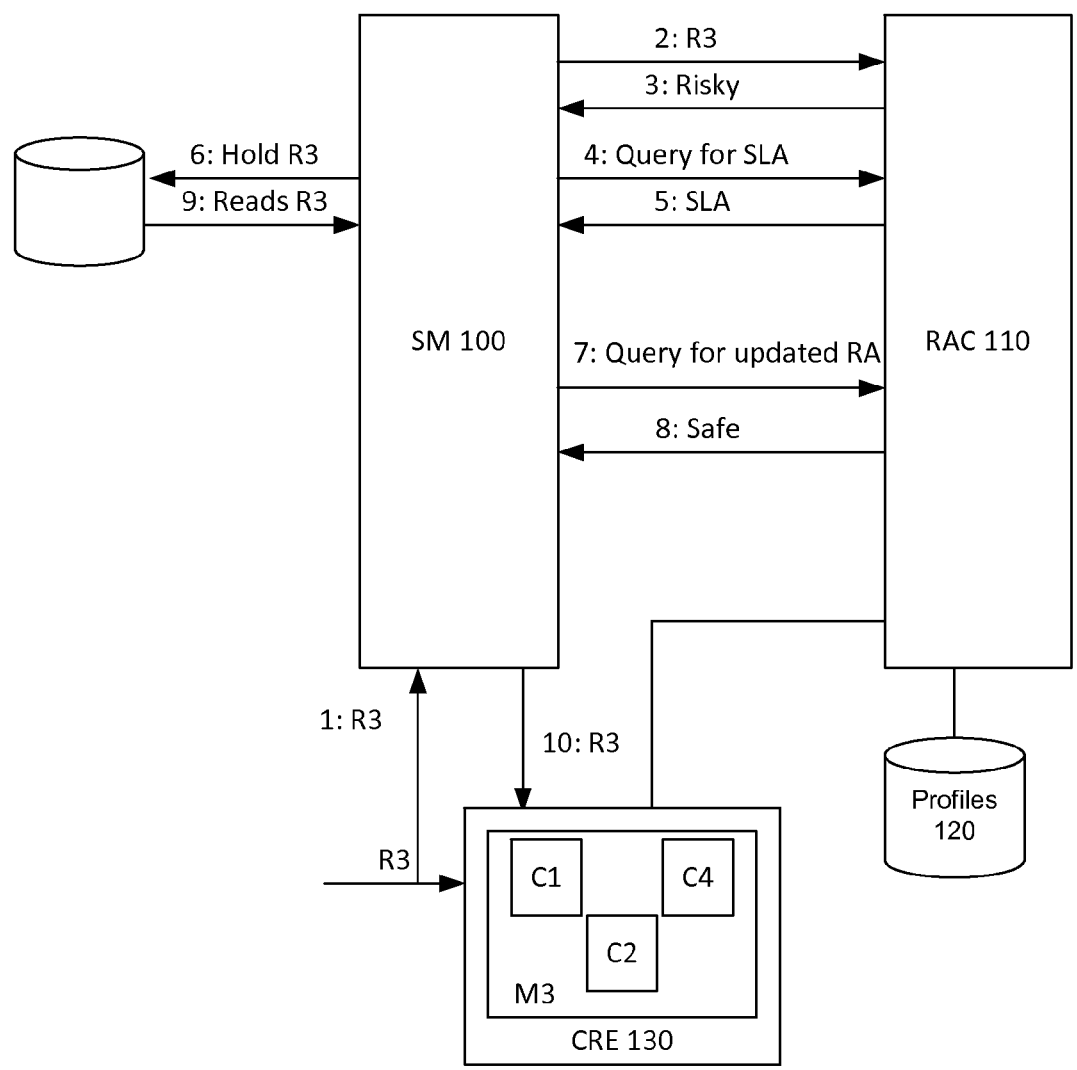

FIGS. 6-8 illustrate examples of service level agreement enforcement according to embodiments of the present invention. Referring to the example illustrated in FIG. 6, (1) a request (R1) targeted for component C1 of virtual machine M1 in the current runtime environment 130 is intercepted by the segmentation module 100 (201, FIG. 2). Examples of C1 are a Java EE application, a database system, and an operating system. The segmentation module 100 extracts request data from the request (R1) (202, FIG. 2), such as the request signature and context. (2) The segmentation module 100 passes the request signature and context to the risk assessment component 110 (203, FIG. 2). The risk assessment component 110 finds a match for the request signature and context in previously recorded requests in the request history profile 302 (401-402, FIG. 4) and determines the request impact on the runtime environment resources from the matching request history profile 302 (403, FIG. 4). The risk assessment component 110 then obtains the current state of the current runtime environment 130 (404, FIG. 4) and determines the risk to the SLA associated with the request (R1) or any other request currently executing if the request (R1) is serviced in the current runtime environment 130 (405, FIG. 4). (3) The risk assessment component 110 outputs the risk assessment and the current state of the current runtime environment 130 to the segmentation module 100 (406, FIG. 4). Assume here that the segmentation module 100 receives a risk assessment of "safe" (501-502, FIG. 5). (4) In response, the segmentation module 100 passes the request to the current runtime environment 130 (503, FIG. 5).

Referring to the example illustrated in FIG. 7, (1) a request (R2) targeted for component C1 of virtual machine M1 in the current runtime environment 130 is intercepted by the segmentation module 100 (201, FIG. 2). The segmentation module 100 extracts request data from the request (R2) (202, FIG. 2), such as the request signature and context. (2) The segmentation module 100 passes the request data to the risk assessment component (203, FIG. 2). The risk assessment component 110 finds a match for the request signature and context in previously recorded requests in the request history profile 302 (401-402, FIG. 4) and determines the request impact on runtime environment resources from the matching request history profile 302 (403, FIG. 4). The risk assessment component 110 then obtains the current state of the current runtime environment 130 (404, FIG. 4) and determines the risk to the SLA associated with the request (R2) or any other request currently executing if the request (R2) is serviced in the current runtime environment 130 (405, FIG. 4). (3) The risk assessment component 110 outputs the risk assessment and the current state of the current runtime environment 130 to the segmentation module 100 (406, FIG. 4). Assume here that the segmentation module 100 receives the risk assessment of "risky" (501-502, FIG. 5). (4) In response, the segmentation module 100 queries the risk assessment component 110 for the SLA associated with the request (R2) (504, FIG. 5), particularly, the response time or the timeframe within which the request (R2) must be serviced and the actual time the request (R2) has taken in the past to be serviced. (5) The risk assessment component 110 returns the SLA, i.e., the time frame within which the request (R2) must be serviced, to the segmentation module 100. Assume here that, based on the comparison of the time frame with the amount of time left for servicing the request (R2), the segmentation module 100 determines there is not enough time to service the request (R2) in the current runtime environment 130 according to the SLA (505-506, FIG. 5). (6) The segmentation module 100 passes the request (R2) to the isolated runtime environment 140 (507, FIG. 5). In this example, the isolated runtime environment 140 includes a virtual machine M3 with components C1 and C4 mirrored from virtual machine M1. Component C2 of virtual machine M1 is not necessary for servicing the request (R2), and thus the virtual machine M3 is not cloned with a mirror of component C2. In this embodiment, the segmentation module 100 further calculates the financial costs associated with running the request (R2) in the isolated environment 140. How the financial costs are calculated may also be based on rules. For example, if the request is sent during business hours and must be executed promptly (based on SLA) and the request cannot be executed in the current environment, then charge an additional 10%.

Referring to the example illustrated in FIG. 8, (1) a request (R3) targeted for component C1 of virtual machine M1 in the current runtime environment 130 is intercepted by the segmentation module 100 (201, FIG. 2). The segmentation module 100 extracts request data from the request (R3) (202, FIG. 2), such as the request signature and context. (2) The segmentation module 100 passes the request signature and context to the risk assessment component 110 (203, FIG. 2). The risk assessment component 110 finds a match for the request signature and context in previously recorded requests in the request history profile 302 (401-402, FIG. 4) and determines the request impact on runtime environment resources from the matching request history profile 302 (403, FIG. 4). The risk assessment component 110 then obtains the current state of the current runtime environment 130 (404, FIG. 4) and determines the risk to the SLA associated with the request (R3) or any other request currently executing if the request (R3) is serviced in the current runtime environment 130 (405, FIG. 4). (3) The risk assessment component 110 outputs the risk assessment and the current state of the current runtime environment 130 to the segmentation module 100 (406, FIG. 4). Assume here that the segment module 100 receives the risk assessment of "risky" (501-502, FIG. 5). (4) The segmentation module 100 queries the risk assessment component 110 for the SLA associated with the request (R3) (504, FIG. 5), particularly the response time or the timeframe within which the request (R3) must be serviced and the actual time the request (R3) has taken in the past to be serviced. (5) The risk assessment component 110 returns the SLA to the segmentation module 100, including the time frame within which the request (R3) must be serviced. Assume here that the segmentation module 100 determines that time is available to service the request (R3) in the current runtime environment 130 (505-506, FIG. 5). However, because of the risk the request (R3) presents to the current state of the current runtime environment 130, (6) the segmentation module 100 holds the request (R3) (508, FIG. 5). (7) At some time later, the segmentation module 100 queries the risk assessment component 110 for an updated risk assessment (509, FIG. 5). The risk assessment module performs a risk assessment using the (updated) current state of the current runtime environment 130. (8) Assume here that the segmentation module 100 receives an updated risk assessment of "safe" from the risk assessment component 110 (510-511, FIG. 5). The segmentation module 100 then (9) reads the request (R3) (512, FIG. 5) and (10) passes the request (R3) to the current runtime environment 130 (503, FIG. 5).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for service level agreement enforcement, implemented by a processor of a computing system, the method comprising:
    intercepting a request for a current runtime environment by a segmentation module of the computing system;
    extracting request data from the request by the segmentation module;
    passing the request data from the segmentation module to a risk assessment component of the computing system, wherein the risk assessment component performs a risk assessment of servicing the request in a runtime environment by: (i) determining a request impact on runtime environment resources from a request history profile matching the request data; and (ii) determining existence of a risk to a service level agreement associated with the request or any other request currently executing if the request is serviced in the current runtime environment, based on the request impact and a current state of the current runtime environment; and
    receiving the risk assessment from the risk assessment component by the segmentation module;
    wherein when the risk assessment indicates existence of the risk to the service level agreement associated with the request or any of the other request currently executing, the request is passed to an isolated runtime environment by the segmentation module;
    wherein when the risk assessment does not indicate existence of any risk to the service level agreement associated with the request or any of the other request currently executing, the request is passed to the current runtime environment by the segmentation module.

2. The method of claim 1, wherein the request history profile comprises request details and the request impact of previously recorded requests, wherein the request history profile matching the request data is found by comparing the request data with the request details of the previously recorded requests.

3. The method of claim 1, wherein the passing of the request to the isolated runtime environment by the segmentation module comprises:
    querying the risk assessment component for the service level agreement associated with the request or any of the other request currently executing;
    determining that the request may to be serviced by the current runtime environment within the requirements of the service level agreement based on the current state of the current runtime environment;
    in response to determining that the request may be serviced by the current runtime environment, holding the request;
    querying the risk assessment component for an updated risk assessment;
    determining that the updated risk assessment does not indicate existence of any risk to the service level agreement associated with the request or any of the other request currently executing; and
    in response to determining that the updated risk assessment does not indicate existence of any risk, reading the request and passing the request to the current runtime environment.

4. The method of claim 1, wherein the passing of the request to the isolated runtime environment by the segmentation module comprises:
    querying the risk assessment component for the service level agreement associated with the request or any of the other request currently executing;
    determining that the request may not to be serviced by the current runtime environment within the requirements of the service level agreement based on the current state of the current runtime environment; and in response to determining that the request may not be serviced by the current runtime environment, passing the request to the isolated runtime environment.

5. The method of claim 1, wherein the passing of the request to the isolated runtime environment by the segmentation module comprises:
provisioning the isolated runtime environment to comprise one or more components mirroring one or more components of the current runtime environment necessary for the servicing of the request.

6. The method of claim 1, wherein the risk to the service level agreement associated with the request or any of the other request currently executing comprises a negative impact on the service level agreement if the request is serviced by the current runtime environment at the current state.

7. A computer program product for service level agreement enforcement, the computer program product comprising a computer readable storage medium having program instructions embodied therewith, the program instructions executable by a processor to cause the processor to perform an operation comprising:
intercepting a request for a current runtime environment by a segmentation module of the computing system;
extracting request data from the request by the segmentation module;
passing the request data from the segmentation module to a risk assessment component of the computing system, wherein the risk assessment component performs a risk assessment of servicing the request in a runtime environment by: (i) determining a request impact on runtime environment resources from a request history profile matching the request data; and (ii) determining existence of a risk to a service level agreement associated with the request or any other request currently executing if the request is serviced in the current runtime environment, based on the request impact and a current state of the current runtime environment; and
receiving the risk assessment from the risk assessment component by the segmentation module;
wherein when the risk assessment indicates existence of the risk to the service level agreement associated with the request or any of the other request currently executing, the request is passed to an isolated runtime environment by the segmentation module;
wherein when the risk assessment does not indicate existence of any risk to the service level agreement associated with the request or any of the other request currently executing, the request is passed to the current runtime environment by the segmentation module.

8. The computer program product of claim 7, wherein the request history profile comprises request details and the request impact of previously recorded requests, wherein the request history profile matching the request data is found by comparing the request data with the request details of the previously recorded requests.

9. The computer program product of claim 7, wherein the passing of the request to the isolated runtime environment by the segmentation module comprises:
querying the risk assessment component for the service level agreement associated with the request or any of the other request currently executing;
determining that the request may to be serviced by the current runtime environment within the requirements of the service level agreement based on the current state of the current runtime environment;
in response to determining that the request may be serviced by the current runtime environment, holding the request;
querying the risk assessment component for an updated risk assessment;
determining that the updated risk assessment does not indicate existence of any risk to the service level agreement associated with the request or any of the other request currently executing; and
in response to determining that the updated risk assessment does not indicate existence of any risk, reading the request and passing the request to the current runtime environment.

10. The computer program product of claim 7, wherein the passing of the request to the isolated runtime environment by the segmentation module comprises:
querying the risk assessment component for the service level agreement associated with the request or any of the other request currently executing;
determining that the request may not to be serviced by the current runtime environment within the requirements of the service level agreement based on the current state of the current runtime environment; and
in response to determining that the request may not be serviced by the current runtime environment, passing the request to the isolated runtime environment.

11. The computer program product of claim 7, wherein the passing of the request to the isolated runtime environment by the segmentation module comprises:
provisioning the isolated runtime environment to comprise one or more components mirroring one or more components of the current runtime environment necessary for the servicing of the request.

12. The computer program product of claim 7, wherein the risk to the service level agreement associated with the request or any of the other request currently executing comprises a negative impact on the service level agreement if the request is serviced by the current runtime environment at the current state.

13. A system for service level agreement enforcement, the system comprising:
a processor; and
a memory containing a program executable by the processor to perform an operation comprising:
intercepting a request for a current runtime environment by a segmentation module of the computing system;
extracting request data from the request by the segmentation module;
passing the request data from the segmentation module to a risk assessment component of the computing system, wherein the risk assessment component performs a risk assessment of servicing the request in a runtime environment by: (i) determining a request impact on runtime environment resources from a request history profile matching the request data; and (ii) determining existence of a risk to a service level agreement associated with the request or any other request currently executing if the request is serviced in the current runtime environment, based on the request impact and a current state of the current runtime environment; and
receiving the risk assessment from the risk assessment component by the segmentation module;
wherein when the risk assessment indicates existence of the risk to the service level agreement associated with the request or any of the other request currently executing, the request is passed to an isolated runtime environment by the segmentation module;

wherein when the risk assessment does not indicate existence of any risk to the service level agreement associated with the request or any of the other request currently executing, the request is passed to the current runtime environment by the segmentation module.

14. The system of claim 13, wherein the passing of the request to the isolated runtime environment by the segmentation module comprises:

querying the risk assessment component for the service level agreement associated with the request or any of the other request currently executing;

determining that the request may to be serviced by the current runtime environment within the requirements of the service level agreement based on the current state of the current runtime environment;

in response to determining that the request may be serviced by the current runtime environment, holding the request;

querying the risk assessment component for an updated risk assessment;

determining that the updated risk assessment does not indicate existence of any risk to the service level agreement associated with the request or any of the other request currently executing; and in response to determining that the updated risk assessment does not indicate existence of any risk, reading the request and passing the request to the current runtime environment.

15. The system of claim 13, wherein the passing of the request to the isolated runtime environment by the segmentation module comprises:

querying the risk assessment component for the service level agreement associated with the request or any of the other request currently executing;

determining that the request may not to be serviced by the current runtime environment within the requirements of the service level agreement based on the current state of the current runtime environment; and in response to determining that the request may not be serviced by the current runtime environment, passing the request to the isolated runtime environment.

16. The system of claim 13, wherein the passing of the request to the isolated runtime environment by the segmentation module comprises:

provisioning the isolated runtime environment to comprise one or more components mirroring one or more components of the current runtime environment necessary for the servicing of the request.

17. The system of claim 13, wherein the risk to the service level agreement associated with the request or any of the other request currently executing comprises a negative impact on the service level agreement if the request is serviced by the current runtime environment at the current state.

18. The system of claim 13, wherein the request history profile comprises request details and the request impact of previously recorded requests, wherein the request history profile matching the request data is found by comparing the request data with the request details of the previously recorded requests, wherein the passing of the request to the isolated runtime environment by the segmentation module comprises, in a first instance:

querying the risk assessment component for the service level agreement associated with the request or any of the other request currently executing;

determining that the request may not to be serviced by the current runtime environment within the requirements of the service level agreement based on the current state of the current runtime environment; and in response to determining that the request may not be serviced by the current runtime environment, passing the request to the isolated runtime environment.

19. The system of claim 18, wherein the passing of the request to the isolated runtime environment by the segmentation module comprises, in a second instance:

querying the risk assessment component for the service level agreement associated with the request or any of the other request currently executing;

determining that the request may to be serviced by the current runtime environment within the requirements of the service level agreement based on the current state of the current runtime environment;

in response to determining that the request may be serviced by the current runtime environment, holding the request;

querying the risk assessment component for an updated risk assessment;

determining that the updated risk assessment does not indicate existence of any risk to the service level agreement associated with the request or any of the other request currently executing; and in response to determining that the updated risk assessment does not indicate existence of any risk, reading the request and passing the request to the current runtime environment.

20. The system of claim 19, wherein the risk to the service level agreement associated with the request or any of the other request currently executing comprises a negative impact on the service level agreement if the request is serviced by the current runtime environment at the current state, wherein the passing of the request to the isolated runtime environment by the segmentation module comprises, in a third instance:

provisioning the isolated runtime environment to comprise one or more components mirroring one or more components of the current runtime environment necessary for the servicing of the request.

* * * * *